June 17, 1969  G. HÜTZ  3,450,030

METHOD AND APPARATUS FOR THE CHARGING OF PLATEN PRESSES

Filed Oct. 3, 1967

INVENTOR:
Gerhard Hütz

BY

Karl F. Ross
ATTORNEY

United States Patent Office 3,450,030
Patented June 17, 1969

3,450,030
METHOD AND APPARATUS FOR THE CHARGING OF PLATEN PRESSES
Gerhard Hütz, Suchteln, Rhineland, Germany, assignor to Eugen Siempelkamp, Krefeld, Germany, a corporation of Germany
Filed Oct. 3, 1967, Ser. No. 672,639
Int. Cl. B30b 13/00, 15/30; B65h 29/68
U.S. Cl. 100—35
10 Claims

ABSTRACT OF THE DISCLOSURE

Method and apparatus for the charging of a platen press wherein a conveyor pallet is provided with a discharge ramp extending beyond the leading edge of a fiber mat by a distance co-ordinated with the speed of the conveyor band forming the floor of the pallet and the means for withdrawing the pallet over the lower platen of the press such that this leading edge of the mat does not pass over the discharge side of the band until the receiving surface thereof has been accelerated to full mat-deposition speed.

---

My present invention relates to a method of and apparatus for the charging of platen presses and, more particularly, to a system for the charging of platen presses using so-called band tablets or conveyor pallets.

In the production of pressed-fiber board, use is commonly made of single-stage or multistage (i.e. single-level or multilevel) presses, whose platens are heated and are capable of rendering relatively loosely coherent mat-like sheets of fiber into rigid or semirigid coherent bodies whose density depends upon the nature of the fibers, the type of binder and the temperature and pressure conditions within the press. In some cases, the binder is the natural lignin and resins within the wood while in other instances, phenol-formaldehyde and other (e.g. urea and resorcinol) thermosetting resins are used as binders. The press is usually provided on one side with the press-charging station adapted to successively or simultaneously charge all the stages of a multiplaten press or designed to feed a succession of crude mats between the platens of a single-stage press. Numerous devices have been proposed for the charging of such presses, one type being conveyor assemblies in which the crude mat is deposited upon a lower platen of a press stage by advancing the conveyor belt in one direction simultaneously and synchronously with the withdrawal of the conveyor belt in the other direction. Such a conveyor assembly, when insertable within the press may be termed a conveyor pallet as will become apparent hereinafter.

While devices of this latter type have been highly effective in increasing the cycling rate of both single-level and multistage presses, several problems have been encountered which, although seemingly of little significance, have proved to be technological obstacles to the widespread use of such systems and have even resulted in the use of charging trays or the like with their undesirable points, namely, the need to recycle relatively massive trays, to store trays temporarily not in use, etc. It has been found, for example, with the use of conveyor tablets, that a large portion of the production of a press, especially on using heated platens is defective or irregular and of poor appearance because of the nonuniform heating of the fiber mats. This difficulty can be visualized when one notes that the leading edge of the mat, as conventionally deposited upon the lower platen, is discharged by the conveyor just as the latter is started and successive portions are brought into contact with the platen still relatively slowly but with progressively increasing rapidity. Even if the press is closed immediately after the conveyor is withdrawn, the greater part of the mat has been in contact with the heated platen for a period sufficiently long, in terms of the time required to cool or activate the resin, that irregular hardening and compression result. The problem cannot be solved by speeding up the rate of withdrawal of the pallet from the press since the pallet can be withdrawn at no greater speed than that at which the forward movement of the band deposits the mat. Furthermore excessive conveyor speeds are no solution to the problem since they do not afford distortion-free deposition of the mats upon the heated platens. It has been found that there is an optimum rate at which the mat may be deposited on the platen for maximum efficiency and yet freedom from distortion, this speed being hereinafter referred to as "full mat-deposition speed." It may be noted also that another disadvantage lies in the charging rate at which conventional or prior-art systems have deposited the mats upon the heated platens.

It is, therefore, the principal object of the present invention to provide an improved charging system for single-level and multiplaten presses in which the aforementioned disadvantages can be avoided, the quality of the product improved and the inconveniences of nonuniform heating of the mat reduced.

I have now found that these objects and others which will become apparent hereinafter, can be attained in a method of charging a platen press, i.e. a single-level or multilevel press having at least two vertically spaced horizontal platens relatively shiftable between an open position defining the space between the pairs of platens and a closed position in which a mat of noncoherent or relatively loosely coherent fibers is compressed, wherein a "charging conveyor pallet" receives the fibrous mat from a dispensing station of conventional type and deposits this mat within the space between the platens; the conveyor pallet has an endless drivable conveyor band forming a mat receiving surface and a side for discharging the mat upon movement of the band in one direction. According to the key feature of this invention, a mat of such fibers with thermally activatable binder (i.e. a synthetic resin of the urea- or phenol-formaldehyde type or a resorcinol resin or the natural wood resins) is deposited upon the receiving surface in a position of the conveyor belt outside the press such that a leading edge of this mat is spaced from the discharge side of the conveyor band, the pallet being then inserted into the space between the platens and, therefore, having an overall vertical thickness less than this space. The mat-carrying surface is, while the conveyor pallet is located between the platens, displaced by rotation of the conveyor band in the aforementioned direction to accelerate the mat toward the discharge edge while the pallet is shifted in the opposite direction synchronously with the displacement of this surface. The leading edge of the mat is positioned with respect to the discharge edge or side of the band such that it passes over this edge and side onto the lower platen *only* when the speed of the conveyor band has reached its maximum or so-called "mat-deposition speed," thereby depositing the mat at a constant and optimum rate with further movement of the conveyor pallet and band surface in opposite directions.

Thus the upper stretch of the conveyor band forms a receiving surface having a dimension in the direction of movement of the band which exceeds the corresponding dimension of the mat by a distance related to the rate of acceleration of the mat-receiving surface at least sufficient to permit the mat-receiving surface to reach full mat-deposition speed before the leading edge of the mat touches the lower platen. Furthermore, the conveyor pallet is inserted into the press, according to a feature of this invention, such that the mat lies fully within the outline of the platens before withdrawal of the pallet commences and the discharge side of the pallet or band and the extension thereof by which the pallet exceeds the width of the mat projects beyond the outlines of these platens, the pallet being shifted in relation to the speed of the band such that the discharge side of the band is withdrawn within the outlines of the platens as the leading edge of the mat is deposited on the lower platen. Advantageously, the discharge extension or side of the pallet or binder converges toward the lower platen so that the mat is deposited therein without distortion.

In accordance with the apparatus aspect of this invention, the charging conveyor pallet may be provided with upstanding lateral walls surrounding the movable mat-receiving surface and projecting thereabove to shape corresponding edges of the mat and impart the correct configuration and dimensions thereto. Furthermore, the means for rotating the conveyor band and withdrawing the pallet may be synchronously related by providing a fixed stop for the band which engages the latter as the pallet is withdrawn from the press by a piston-and-cylinder assembly or other means, e.g. of the type described and illustrated in the copending applications Ser. No. 534,324, now Patent No. 3,379,322 and 545,340, now Patent No. 3,379,124, for press-charging trays. It will be understood, however, that other systems may be employed and that the conveyor bands can be driven by electric motors mounted upon the pallet or by flexible shaft assemblies coupled with the conveyor rollers and driven by motors fixedly positioned at a location spaced from the press-charging assembly.

The advantages of the aforedescribed system derive in part from the higher and more uniform rate at which the mats or fibers are deposited in a relatively short time upon the heated press platen and, consequently, the decrease in the differences with which various parts of the mat contact the platens. Undesirable acceleration of hardening or thermal thinning of the thermosetting or thermoplastic binders are avoided and the nonuniform densification of the mat can be eliminated or reduced. Moreover, since the acceleration of the speed of the mat can take place more slowly without affecting the length of time with which the leading portions of the mat contact the platens, distortions in the surface of the product resulting from rapid changes in velocity are avoided and the appearance and quality of the pressed board are improved. The system is applicable for noncoherent loosely piled mats as well as mats which have been subjected to a prepressing and, therefore, for pressure-cooked fibers, sawdust and raw chips.

The above and other objects, features and advantages of the present invention will become more readily apparent from the following description, reference being made to the accompanying drawing, in which.

Figure 1:
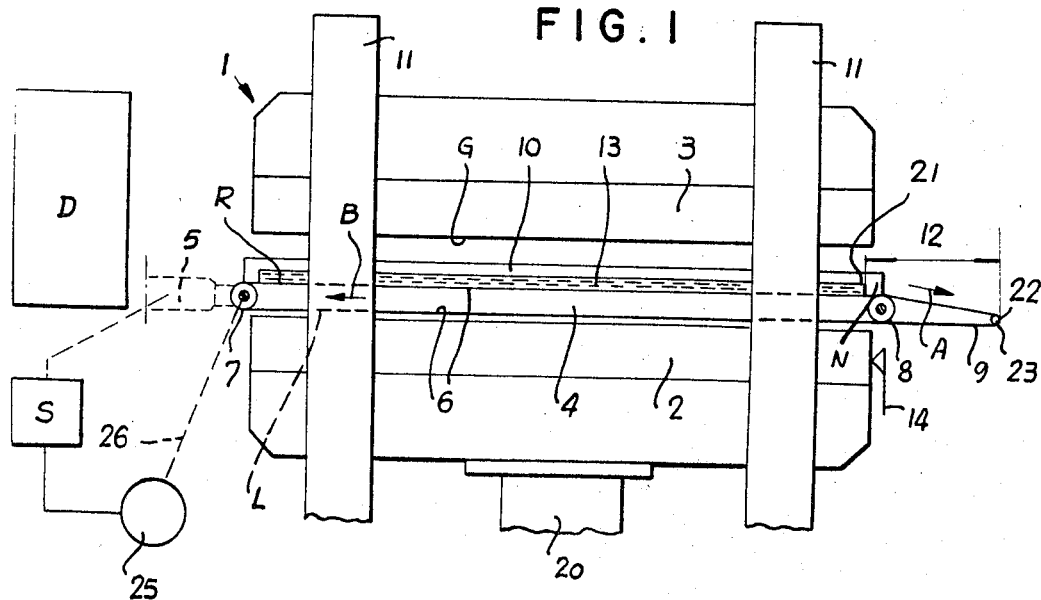
FIG. 1 is an elevational view, somewhat in diagrammatic form, of a press-charging installation embodying the present invention.

In the drawing, I show a single-platen press 1 (although a similar assembly is operative for each stage of a multi-level press) which comprises a pair of press frames 11 in which the upper platen or head press 3 is fixedly mounted. The lower platen 2 is vertically guided in the frames 11 and can be moved by the hydraulic cylinder 20 upwardly relative to the head press 3 to close the press and downwardly to open the latter in conventional fashion. According to the present invention, the press-charging system comprises a conveyor pallet 4 of box-like construction which is displaceable horizontally via a piston-and-cylinder assembly 5 to charge the press as described in greater detail hereinafter. In addition to a pair of upright walls 10 flanking the receiving surface R of the conveyor pallet 4 and shaping the lateral edges of the mat 13 deposited thereon, the conveyor pallet comprises a plurality of spaced-apart rollers 7 and 8 about which an endless conveyor band 6 extends. Upstream of the press 1, I provide a dispensing station D for depositing the mats 13 of wood fibers upon the receiving surface R when the conveyor pallet 4 is withdrawn to the left out of the press 1 and into the dispensing station.

The leading edge 21 of the mat 13 terminates short of the discharge edge 22 of the conveyor band 6 and the pallet, the edge 22 being formed by a reversing guide 23 about which the upper stretch of the belt is turned to form the lower stretch L. According to the principal feature of this invention, the receiving surface R of the conveyor pallet 4 is extended by a distance 12 between the leading edge 21 of the mat 13 and the discharge edge 22 of the conveyor, i.e. a distance sufficient to enable this leading edge 21 to reach the discharge edge only after the band 6 has been accelerated either by its own motor or the withdrawal mechanism 5 to the full mat-deposition speed. Whereas the leading edge 21 of a conventional conveyor pallet normally rests upon the discharge portion or tongue thereof, in the present case the region 12 is formed by a downwardly convergent tapering tongue 9 forming a ramp which substantially meets the upper surface 24 of the platen as the leading edge is to be deposited thereon. One of the rollers 7 or 8 can be driven by a motor 25 via a flexible shaft 26 in the event independent but synchronous displacement of the band or pallet is desired. To the end, the motor 25 and the hydraulic cylinder 5 are operated by a synchronizing circuit S. The lateral walls 10 are omitted at the front end of the conveyor pallet to form a window W through which the mat 13 is discharged when the receiving surface R is displaced in the direction of arrow A as the pallet itself is withdrawn in the direction of arrow B.

The receiving surface R of the conveyor pallet 4 extends beyond the leading edge 21 of the mat 13 by the acceleration section 12 which is approximately the distance by which the dimension of the receiving surface of the pallet exceeds the corresponding dimension of the mat 13. The overall thickness of the conveyor pallet is less than the width of the space or gap G formed between the platens 2 or 3 in the open condition of the press so that the conveyor pallet can be inserted between these platens with the mat 13 lying wholly within the outlines of the lower platen 2 and the leading edge 21 aligned with the point 17 on the lower platen 2 at which it is to be positioned when the mat 13 is deposited upon it. The platens 2 and 3 can be heated in the usual manner by electric heating elements or a heating fluid. In this position of the pallet 4, the discharge side 9 of the pallet extends laterally beyond the rear edge 14 of the palten 2 by an amount approximating the distance 12.

When, in accordance with the principles of the present invention, the mechanism 5 is actuated to withdraw the pallet 4 in the direction of arrow B, the drive 25 is operated to rotate the receiving surface R of the conveyor band 6 (i.e. the upper stretch) in the direction of arrow A at a rate precisely synchronized with the withdrawal of the pallet. A finite time is required for the surface R to reach its maximum speed, i.e. the full mat-deposition velocity, this period $t$ being related to the acceleration $a$ of the band 6 and the distance $d$ represented by the discharge portion 12 of the ramp in accordance with the relationship:

$$t = \sqrt{\frac{2d}{a}}$$

Figure 2:
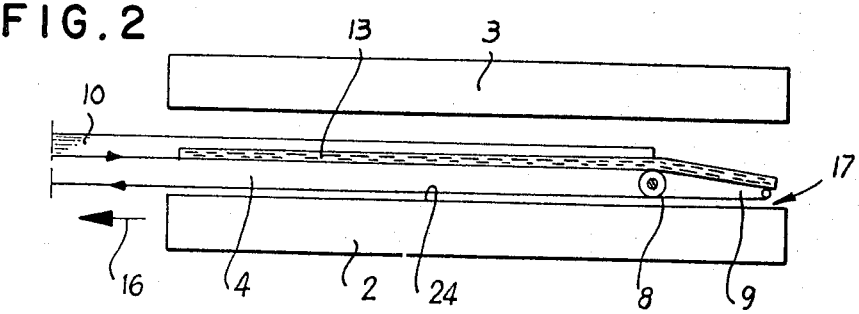
FIG. 2 is a diagrammatic view showing a subsequent stage in the mat-deposition operation.

When the leading edge 21, after the elapse of this time period, contacts point 17 of the platen 2, the surface R has reached its maximum speed $v$ as determined by the relationship $v = a \cdot t$ (See FIG. 2), this speed remaining constant as the entire mat 13 is deposited upon the platen 2

Figure 3:
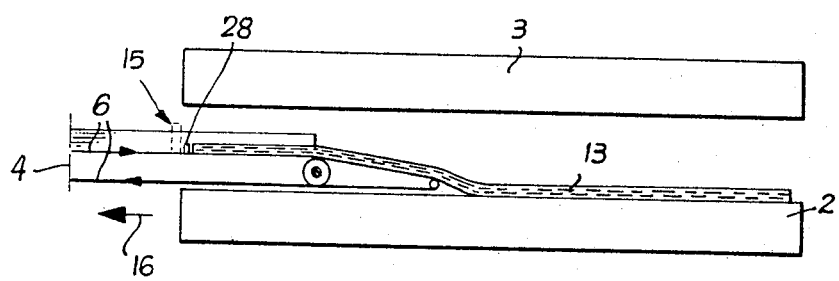
FIG. 3 is a view similar to FIG. 2 of a further stage thereof.

(see FIG. 3). Instead of the motor 25, a stop 15 may be provided for engagement with a member 28 on the receiving surface of the pallet 4 which is rendered effective when the pallet is withdrawn as represented by arrow 16. This eliminates the need for the synchronizing mechanism 3.

The invention described and illustrated is believed to admit of many modifications within the ability of persons, skilled in the art, all such modifications being considered within the spirit and scope of the appended claims.

I claim:
1. A method of charging a platen press, having at least two platens vertically spaced apart and defining between them a space for receiving a fibrous mat, with a charging conveyor pallet adapted to fit in said space and having an endless drivable conveyor band with a mat-receiving surface and a side for discharging said mat upon movement of said band in one direction, said method comprising the steps of:
   (a) depositing a mat upon said receiving surface in a position of said conveyor pallet outside said press with a leading edge of said mat spaced from said side;
   (b) inserting said conveyor pallet into said space between the platens;
   (c) displacing said surface by rotating said conveyor band in said one direction to accelerate said mat and said edge toward said side and bring said surface to full mat-deposition speed before said edge leaves said surface;
   (d) shifting said pallet in the opposite direction synchronously the displacement of said surface in said one direction to deposit said mat between said platens only after said surface has reached said speed.

2. The method defined in claim 1 wherein said surface is formed by the upper stretch of said conveyor band and has a dimension in said one direction exceeding the corresponding dimension of said mat by a distance related to the rate of acceleration of said surface at least sufficient to permit said surface to reach said speed before said edge leaves said surface at said side of said conveyor.

3. The method defined in claim 2 wherein said charging conveyor pallet is inserted into said space between said platen in step b such that the mat carried by said surface lies fully within the outlines of said platens and said side extends beyond the outlines of said platens.

4. The method defined in claim 3 wherein said pallet is shifted in step d in relation to the speed of said band such that said side of said band is drawn within the outlines of said platens as said edge of said mat is deposited on the lower one of said platens.

5. The method defined in claim 3 wherein said side of said conveyor band converges toward the lower one of said platens and said mat is deposited thereon without distortion.

6. An apparatus for the charging of a platen press having at least two vertically spaced platens defining between them a space for receiving a fibrous mat adapted to be compressed into a fiberboard upon closure of said platens, said apparatus comprising:
   (a) a charging conveyor pallet receivable between said platens in said space and shiftable horizontally into and out of said space for the charging of said press, said charging conveyor pallet comprising an endless conveyor belt having an upper stretch forming a mat-receiving surface and a side of said band for discharging said mat upon movement of said band in one direction;
   (b) means for depositing a mat upon said receiving surface in a position of said conveyor belt outside said press with a leading edge of said mat spaced from said side;
   (c) means for inserting said conveyor belt into said space between said platens; and
   (d) means for displacing said surface by rotating said conveyor band in said one direction while withdrawing said conveyor pallet in the opposite direction to accelerate said mat and said edge toward said side and progressively increase the speed of said surface to full mat-deposition speed before said edge leaves said surface, thereby depositing said mat between said platens only after said surface has reached said speed.

7. An apparatus as defined in claim 6 wherein said conveyor band is formed at said side with a ramp converging in the direction of the lower one of said platens, said ramp extending beyond said leading edge of said mat prior to displacement of said band by a distance sufficient to permit said surface to reach said mat deposition speed before said edge of said mat is discharged from said ramp.

8. An apparatus as defined in claim 7 wherein said pallet has a dimension in said one direction exceeding the corresponding dimension of said mat and said platens whereby said side of said band overhangs said lower platen upon insertion of said pallet into said space between said platens, said means for shifting said pallet in the opposite direction being constructed and arranged to draw said side of said band inwardly over the outline of said platen just as said edge is deposited upon said lower platen.

9. An apparatus as defined in claim 8 wherein said conveyor pallet is provided with means extending above said surface for shaping said mat.

10. An apparatus as defined in claim 9 wherein the means for displacing said surface includes a fixed member engageable with said band upon withdrawal of said pallet in said opposite direction.

References Cited

UNITED STATES PATENTS 516,386  3/1894  Wood _____ 271—76

EDWARD A. SROKA, *Primary Examiner.*

U.S. Cl. X.R.

100—215; 271—45, 68